(12) United States Patent  
Massie

(10) Patent No.: US 9,372,203 B1  
(45) Date of Patent: Jun. 21, 2016

(54) ACTUATORS FOR SECURING PROBES IN A SCANNING PROBE MICROSCOPE

(71) Applicant: James Massie Design, Inc., Santa Barbara, CA (US)

(72) Inventor: James Massie, Santa Barbara, CA (US)

(73) Assignee: JAMES MASSIE DESIGN, INC., Santa Barbara, CA (US)

( * ) Notice: Subject to any disclaimer, the term of this patent is extended or adjusted under 35 U.S.C. 154(b) by 0 days.

(21) Appl. No.: 14/800,455

(22) Filed: Jul. 15, 2015

Related U.S. Application Data

(60) Provisional application No. 62/028,192, filed on Jul. 23, 2014, provisional application No. 62/044,727, filed on Sep. 2, 2014.

(51) Int. Cl.  
*G01Q 70/02* (2010.01)

(52) U.S. Cl.  
CPC .................................... *G01Q 70/02* (2013.01)

(58) Field of Classification Search  
None  
See application file for complete search history.

(56) References Cited

U.S. PATENT DOCUMENTS

| | | | | |
|---|---|---|---|---|
| 4,992,660 A * | 2/1991 | Kobayashi | ............. | G01Q 60/16 250/307 |
| 5,705,814 A * | 1/1998 | Young | ................... | B82Y 35/00 250/307 |
| 6,435,015 B1 * | 8/2002 | Yamamoto | ............. | B82Y 35/00 73/105 |
| 7,597,717 B1 * | 10/2009 | Lu | .......................... | B82Y 35/00 850/21 |
| 7,709,791 B2 * | 5/2010 | Jo | .......................... | G01Q 70/02 250/201.3 |
| 8,099,793 B2 * | 1/2012 | Jo | .......................... | G01Q 70/02 850/40 |
| 8,689,360 B2 * | 4/2014 | Jeon | ....................... | B82Y 35/00 850/21 |
| 8,910,311 B2 * | 12/2014 | Humphris | .............. | G01Q 70/06 850/1 |
| 2011/0173729 A1 * | 7/2011 | Feinstein | ................ | G01Q 70/06 850/8 |

* cited by examiner

*Primary Examiner* — Andrew Smyth  
(74) *Attorney, Agent, or Firm* — SoCal IP Law Group LLP; Guy Cumberbatch

(57) ABSTRACT

Disclosed are various actuators for probe exchangers for use in scanning probe microscopes (SPMs). The probe exchange actuators are designed so as to impose no net forces on a probe clamp attached to the high resolution piezoelectric positioning mechanism to which the probe is being transferred. These actuators therefore impose no net force on the delicate high resolution piezoelectric positioning mechanism, thus helping protect it from physical damage during the probe exchange process.

19 Claims, 17 Drawing Sheets

Probe Clamp Module (Closed Position)

(c) 2015 James Massie Design, Inc.

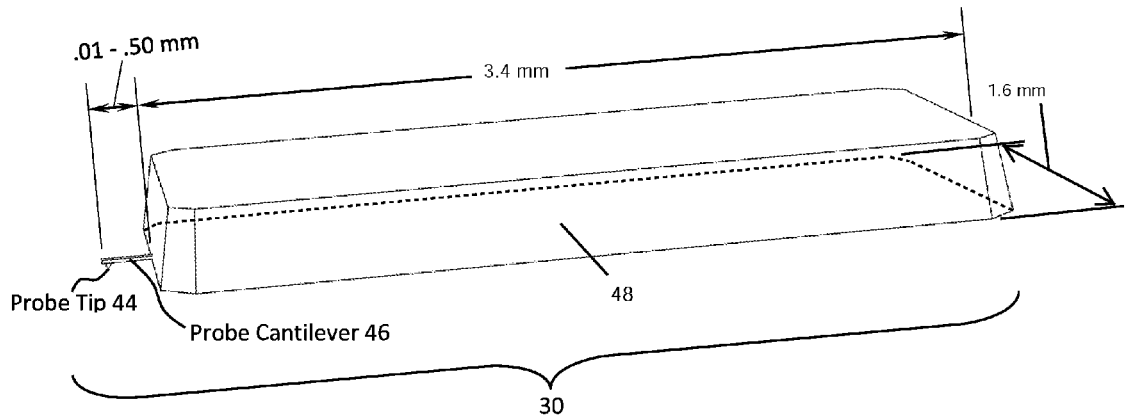
Fig. 1: Typical SPM Probe
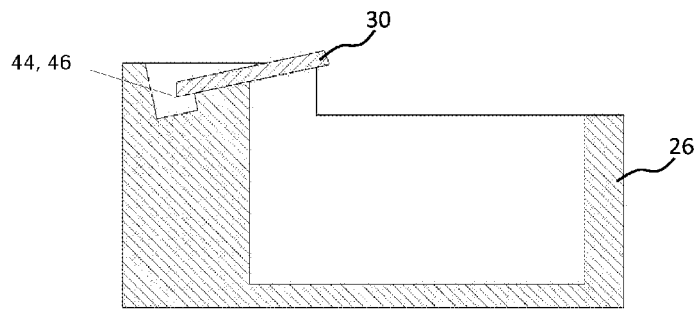
Fig. 2A: Probe Storage Device with Probe
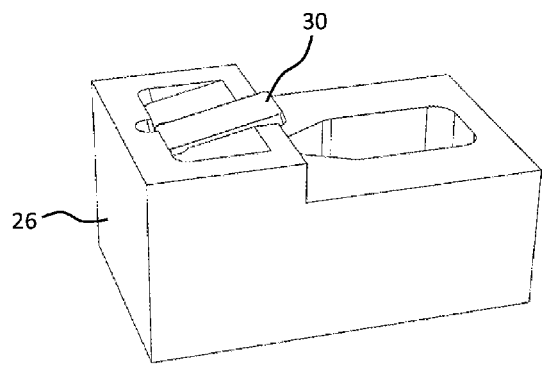
Fig. 2B: Probe Storage Device with Probe

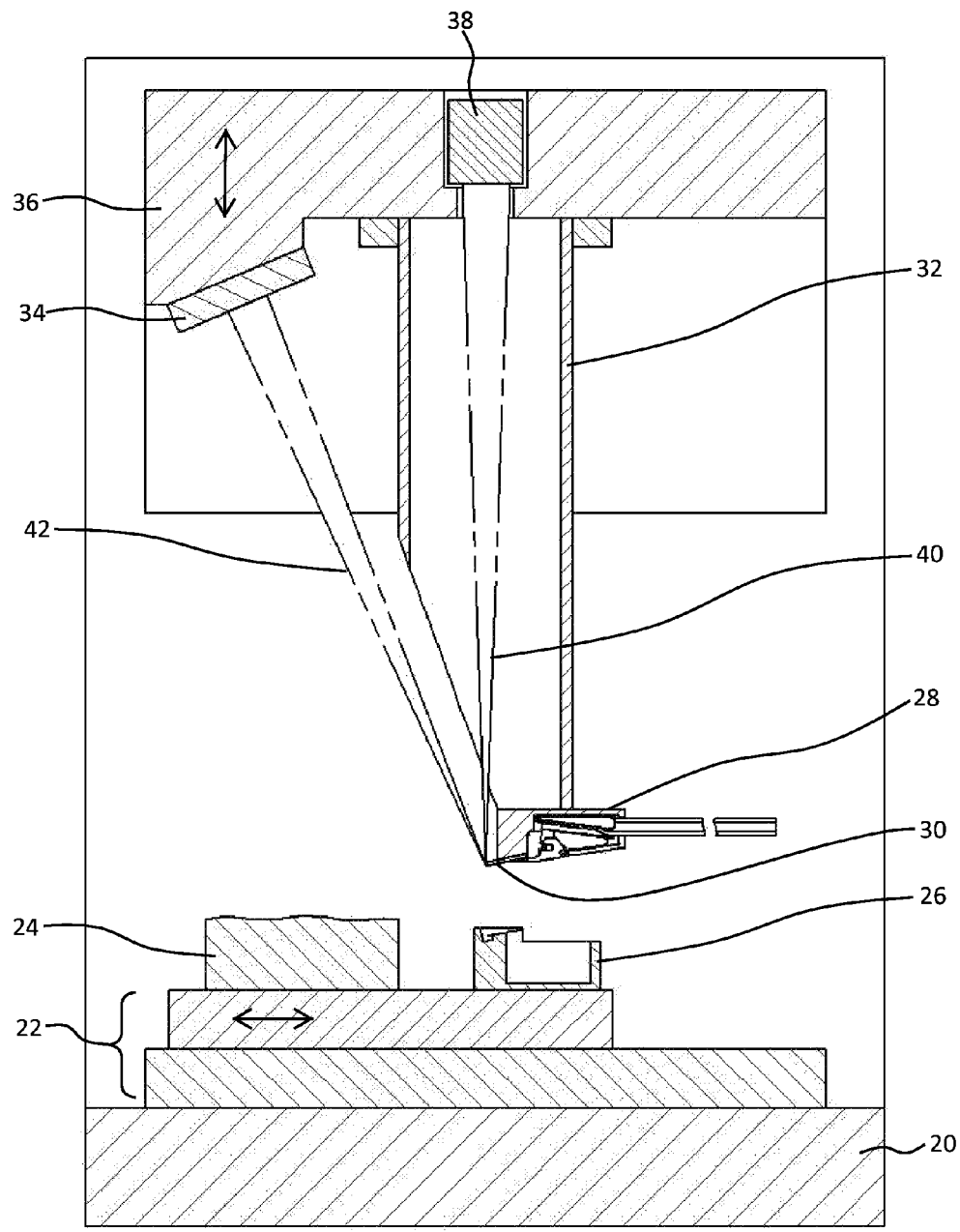
Fig. 3A : Scanning Probe Microscope with Probe Clamp Module

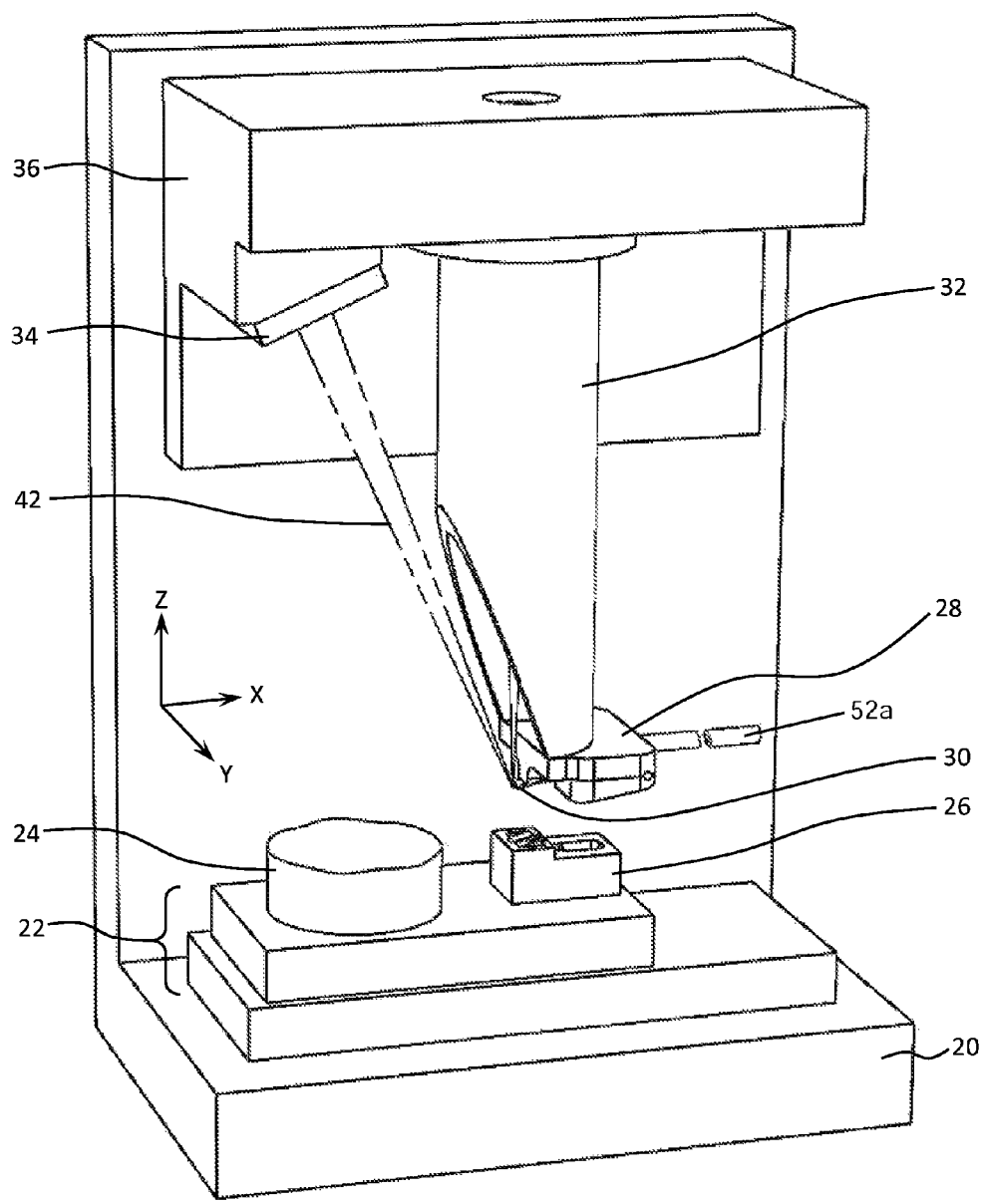
Fig. 3B: Scanning Probe Microscope with Probe Clamp Module

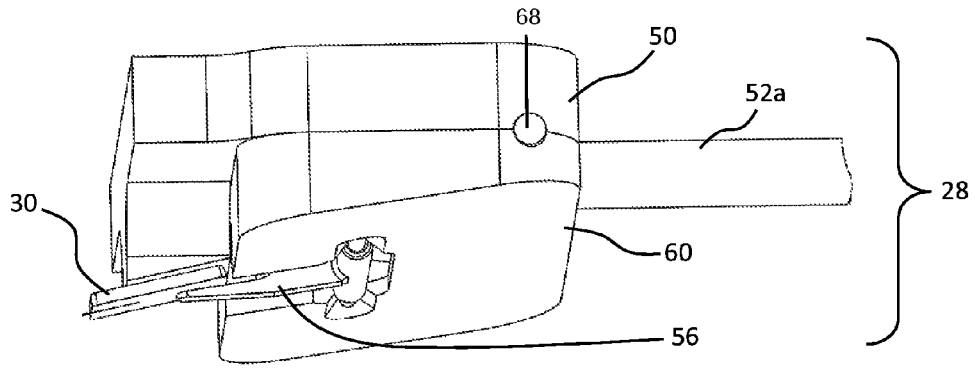
Fig. 4A : Probe Clamp Module (Closed Position)
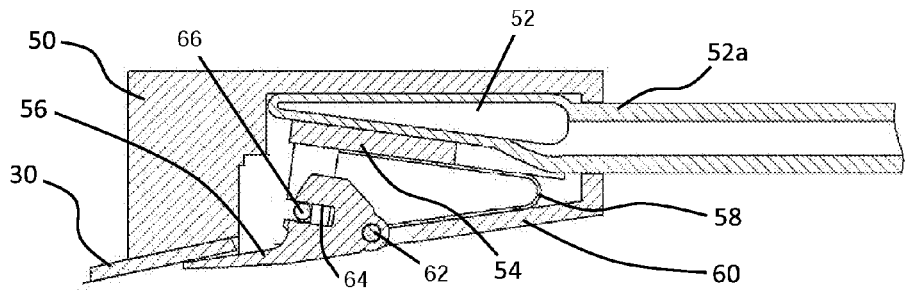
Fig. 4B : Probe Clamp Module (Closed Position)
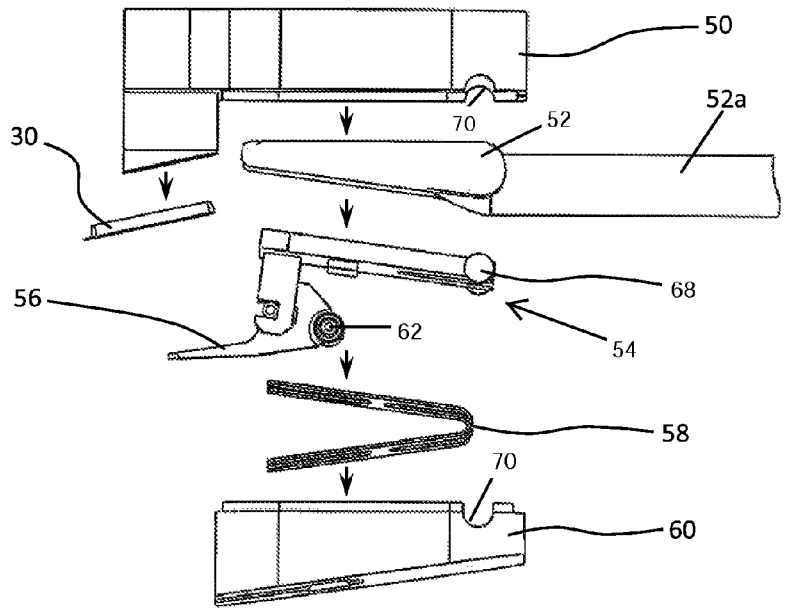
Fig. 4C: Probe Clamp Module (Closed Position)

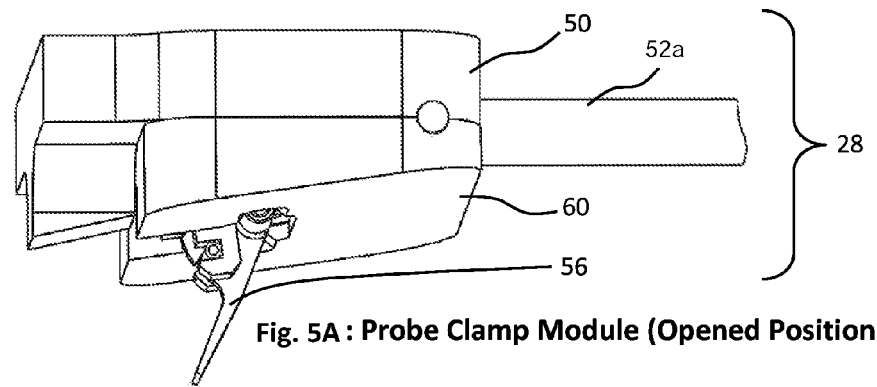
Fig. 5A : Probe Clamp Module (Opened Position)
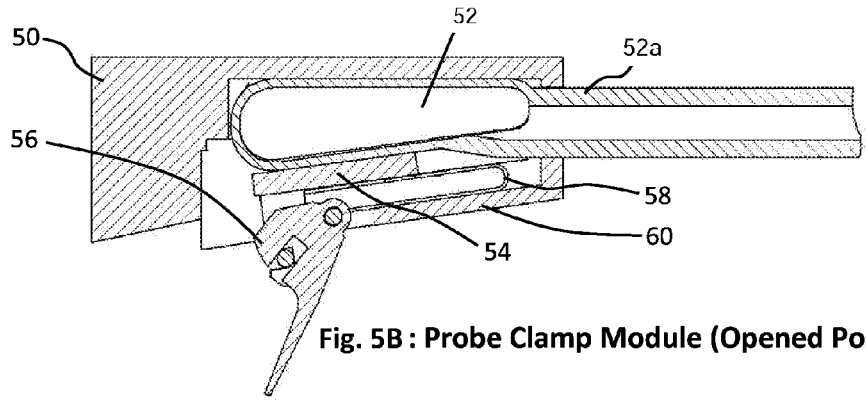
Fig. 5B : Probe Clamp Module (Opened Position)
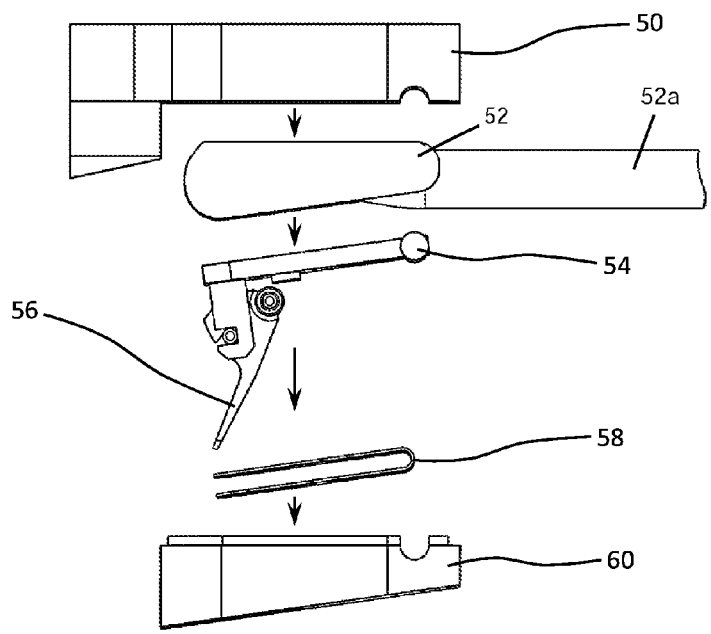
Fig. 5C: Probe Clamp Module (Opened Position)

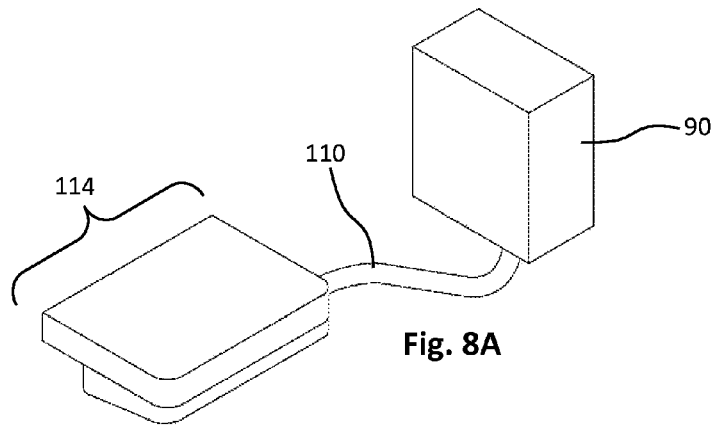
Fig. 8A
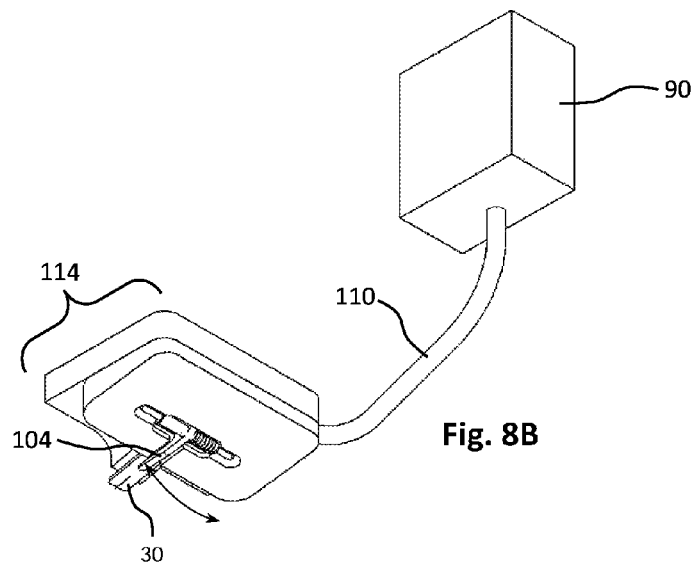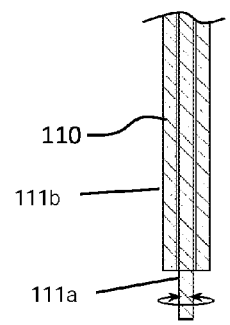
Fig. 8B
Fig. 9
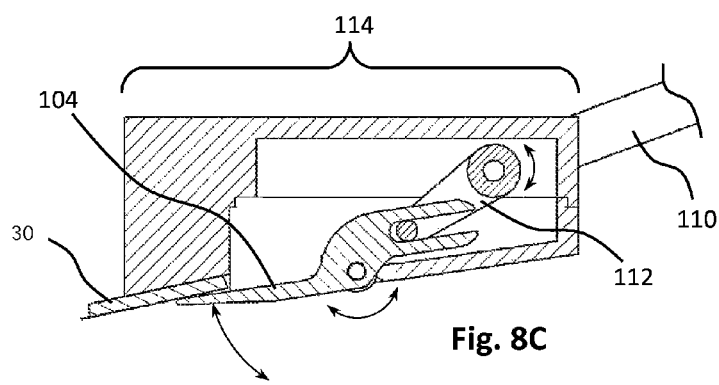
Fig. 8C

ACTUATORS FOR SECURING PROBES IN A SCANNING PROBE MICROSCOPE

RELATED APPLICATION INFORMATION

The present application claims priority under 35 U.S.C. §119 to prior U.S. Provisional Application Nos. 62/044,727, filed Sep. 2, 2014 and 62/028,192, filed Jul. 23, 2014, the contents of which are hereby expressly incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Scanning probe microscopes (SPMs) are a powerful family of microscopes used to form images of nanoscale surfaces and structures, down to atomic dimensions. Images are attained by scanning an extremely sharp probe tip across the surface of a sample, typically back and forth in a raster pattern, via the use of a piezoelectric actuator. The probe's tip can be as sharp as a single atom. It can be moved precisely and accurately across the sample surface, even atom by atom. The probe can be moved, or scanned, in relation to a stationary sample, or the sample can be scanned in relation to a stationary probe. The movement resolution varies somewhat from technique to technique, but some probe techniques reach atomic resolution due to the ability of piezoelectric actuators to precisely execute motions on electronic command.

One common example of an SPM is the atomic force microscope (AFM), which scans the sharp probe tip, attached to a flexible spring lever (commonly called a cantilever) in relation to the sample surface. The probe tip, the cantilever, and the support substrate are together herein referred to as "the probe". By measuring motion, position or angle of the free end of the cantilever, many properties of the surface may be determined including surface topography, local adhesion, friction, elasticity, the presence of magnetic or electric fields, etc. In many such cantilever-based SPMs the probe is mounted to the end of a piezoelectric crystal or to a piezoelectric driven flexure scanner, both of which induce precise and rapid movements of the probe.

In the case of AFMs and other cantilever-based SPMs, when the probe tip is near the sample surface the cantilever is deflected by a force. Such SPMs can measure deflections caused by many kinds of forces, including mechanical contact, electrostatic forces, magnetic forces, chemical bonding, van der Waals forces, and capillary forces. The distance of the deflection is typically measured by a laser that is reflected off the top of the cantilever and onto a position sensing photodiode. SPMs can detect differences in height that are a fraction of a nanometer, about the diameter of a single atom. During this scanning process, a computer gathers data that are used to generate an image of the surface. In addition to visualizing nanoscale structures, some kinds of SPMs can be used to manipulate individual atoms and move them to create specific patterns.

Other SPMs include the scanning near-field optical microscope, the scanning capacitance microscope, the scanning magnetic force microscope, the scanning electric field microscope, the scanning ion conductance microscope, the scanning tunneling microscope (which typically does not utilize a cantilever), and several others.

The piezoelectric actuators are typically made of naturally occurring crystals such as quartz, berlinite ($AlPO_4$), topaz, tourmaline-group minerals, barium titanate, and lead titanate, each of which is relatively brittle and expensive.

In many of these scanning probe techniques the probes become quickly damaged, contaminated or dull, and must be replaced to regain the ability to make high quality measurements of a sample. Also, frequent interchange of different specialized probes for detecting various sample characteristics may be required. Exchange of the probes happens as frequently as every hour in a busy laboratory. One of the more difficult and time consuming aspects of operating a scanning probe microscope (SPM) entails the manual exchange of these extremely small and difficult to handle probes. The cantilevers on these probes may be as long as the width of a human hair, and extend from a support substrate that may typically be about 3.4 mm long, 1.6 mm wide, and 0.3 mm high.

In the prior art, probe exchange has been done manually by an operator who removes the old probe and reinstalls a new probe. Changing probes demands skill and dexterity and they are easily damaged in the process. Because of the delicate nature of the probes, replacement of the probe in some SPM designs may take many minutes, as described in U.S. Pat. No. 5,376,790, assigned to Park Scientific Instruments. During this time, the SPM instrument is unavailable for use, so minimal probe exchange time is essential for high sample throughput. Additionally as scanning probe microscopes become more widely used, there is increasing pressure to develop instruments that can be operated more quickly and used by less-skilled operators, and even driven automatically without operator intervention. Achieving these goals will open the SPM market to a significantly larger customer base.

Most of the prior art scanning probe microscopes have no provision for automatic probe exchange. These systems require that an old probe be removed by hand and a new probe installed by hand in its place. A few systems have multiple probes mounted on carousels or similar rotatable carriers. Additionally, U.S. Pat. No. 5,705,814 to Young discloses means for automatic probe exchange including a clamp on a probe mount which is opened and closed by external actuators. In this case, the use of external actuators can impart forces upon the piezoelectric crystal or piezoelectric driven flexure scanner, sufficient to cause damage to said piezoelectric crystal or piezoelectric driven flexure scanner.

U.S. Pat. No. 5,705,814, referenced above, also discloses a method for probe exchange utilizing a vacuum to directly attach the probe to a mounting interface. While this is effective in cleanroom environments free from dust and airborne particulates, it is not effective in ambient conditions typical of laboratory environments. In this case airborne particulates become lodged in the interface between the probe and its mating surface. These enable microscopic vacuum leaks within the interface causing turbulence and imparting vibration to the probe, resulting in unacceptable system noise. The need for a clean room environment greatly restricts the usefulness of such systems, since most labs that utilize SPMs are not so equipped.

Another probe exchange system described in U.S. Pat. No. 8,099,793 to Jo discloses a magnetic pick-up which requires the use of an intermediate metal probe carrier acted upon by competing magnetic fields. The requirement of such an intermediate probe carrier necessitates an initial undesirable time-consuming process. That is, aligning and adhering the given probe to the metal probe carrier. U.S. Pat. No. 7,597,717 discloses a rotatable multi-cantilever scanning probe microscopy head and methods of changing of probes via rotation of multi-probe cartridges. Additionally, U.S. Pat. No. 8,689,360 discloses a similar rotatable multi-probe holder. While the use of such multi-probe cartridges or multi-probe holders may be convenient, these cannot effectively be mounted to high speed scanners which actuate in the Z-axis, since the additional mass detrimentally impacts scan speed.

There is thus a need for a probe exchange device which does not require an intermediate probe carrier, is small and lightweight, is operable under ambient conditions, and which may be actuated frequently and without risk of damaging the highly precise piezoelectric displacement mechanisms.

SUMMARY OF THE INVENTION

Disclosed are various actuators for probe exchangers for use in scanning probe microscopes (SPMs). The probe exchange actuators are designed so as to impose no net forces on a probe clamping mechanism attached to the high resolution piezoelectric positioning mechanism to which the probe is being transferred. The term, "no net force" means that there are no external forces associated with clamping the probe in place or with releasing it. Another useful term is that an actuator that imposes no net forces is "internal" to the scanning probe microscope, as opposed to an "external" actuator which imposes net forces upon the piezoelectric assembly. With that said, there may be relatively minor or de minimus "external" forces associated with positioning the clamp over each probe, as will be explained below.

The probe clamp may be mounted to various types of scanners, and is lightweight so that it does not interfere with high speed Z-axis displacements of the piezoelectric mechanisms. The actuator may be pneumatically or hydraulically powered via a flexible hose loosely connected to the actuator and clamp module. Alternatively, the actuator may utilize a linear or rotary flexible cable that connects to the clamp module and generates isometric forces therein so that no external forces are imparted.

BRIEF DESCRIPTION OF THE DRAWINGS

FIG. 1 is a perspective view of a typical Scanning Probe Microscope (SPM) probe.

FIG. 2A is a cutaway view of the probe storage device with probe.

FIG. 2B is a perspective view of the probe storage device with probe.

FIG. 3A is a simplified cutaway view of a typical optical deflection-based scanning probe microscope, including the pneumatically or hydraulically actuated probe clamp module.

FIG. 3B: is a simplified perspective view of a typical optical deflection-based scanning probe microscope, including the probe clamp module.

FIG. 4A is a perspective view of the probe clamp assembly in its closed position.

FIG. 4B is a cutaway view of the probe clamp assembly in its closed position.

FIG. 4C is an exploded view of the probe clamp assembly in its closed position.

FIG. 5A is a perspective view of the probe clamp assembly in its opened position.

FIG. 5B is a cutaway view of the probe clamp assembly in its opened position.

FIG. 5C is an exploded view of the probe clamp assembly in its opened position.

FIGS. 8A and 8B are perspective views of one embodiment of a rotationally-actuating transducer assembly and associated probe holder.

FIG. 8C is a cross-sectional close-up view of the probe holder of the assembly shown in FIGS. 8A and 8B FIG. 9 is a cross-sectional view of one embodiment of a rotationally actuated cable of the assembly shown in 8A-8C.

DETAILED DESCRIPTION

Figure 6A:
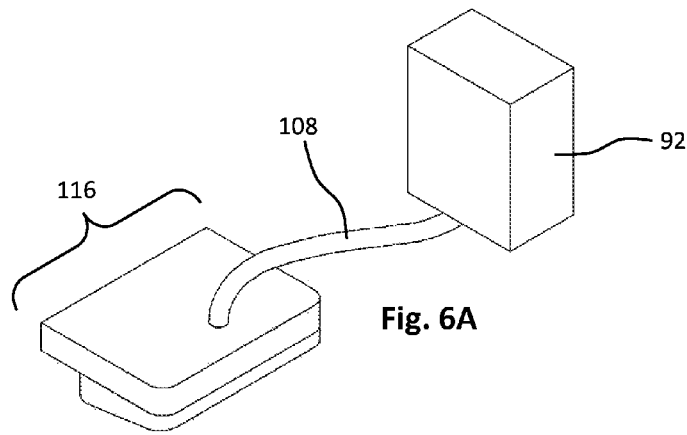
FIGS. 6A and 6B are perspective views of one embodiment of a linear-actuating transducer assembly and associated probe holder.

This invention attends to the problem of probe exchange in a scanning probe microscope (SPM) via methods of transferring the probe such that manual handling is no longer required. The transfer mechanism designs are compact and lightweight, features often critical for scanning probe microscopes. The probe transfer mechanisms involve the use of a transducer or actuator to cause the SPM probe holder to grasp and release the SPM probe. Moreover, the probe clamp mechanisms are configured so as to apply no net force on delicate probe positioning systems to avoid damage thereto.

While SPMs are available in a variety of forms, the approaches described herein apply to systems in which the probe is scanned in at least the Z axis. Although several styles of SPMs are presented in this document, they are representative only, and included to illustrate a subset of possible configurations.

One especially advantageous aspect described herein is probe exchange actuators and transducers therefor that are mounted so as to impose no net forces on the probe clamp attached to the high resolution piezoelectric positioning mechanism to which the probe is being transferred. The term, "no net force" means that there are no external forces associated with clamping the probe in place or with releasing it. Another useful term is that an actuator that imposes no net forces is "internal" to the scanning probe microscope's piezoelectric scanner, as opposed to an "external" actuator which does impose net forces.

FIG. 1 provides a perspective view of a typical SPM probe 30. Such probes typically consists of three parts: the probe substrate 48, at approximately 3.4 mm long×1.6 mm wide× 0.3-0.5 mm thick, the probe cantilever 46 which is approximately 10-500 µm long and 5-20 µm wide and extends off one end of probe substrate 48, and the typically conical or pyramidal probe tip 44 located on the free end of probe cantilever 46, and which contacts, or is in closest proximity to the sample.

FIGS. 2A and 2B provide cutaway and perspective views of an exemplary probe storage device 26 with probe 30 in place. While accommodation for only one probe 30 is shown for simplicity, accommodation for multiple probes may be made as well. The surface(s) of probe storage device 26 upon which probe(s) 30 rest may be treated with a mild adhesive to gently hold probe(s) 30 in place during storage.

FIGS. 3A and 3B provide simplified cutaway and perspective views of a typical piezo-tube scanner SPM. The SPM includes a base 20, an XY translation stage 22, a sample 24 to be measured, high resolution positioning mechanism 32, and a probe clamp module 28 that holds the probe 30. The XY translation stage 22 positions the sample 24 beneath probe clamp module 28, which is mounted to high resolution positioning mechanism 32, and Z axis translation stage 36 raises and lowers the high resolution positioning mechanism 32 and probe clamp module 28 with respect to the sample 24. SPMs typically scan probe tip 44 (FIG. 1) of probe 30 along the surface of the sample 24 in a raster pattern approximately within the top plane of the sample, generally referred to as the XY plane. The raster movement is achieved via the high resolution positioning mechanism 32, which often includes a piezoelectric element. In FIGS. 3A and 3B, positioning mechanism 32 is a delicate piezoelectric crystal tube type of scanner. During this process probe cantilever 46 is displaced in the Z axis (which is typically vertical) as a function of sample height, or another characteristic such as magnetic field, electric field, etc.

Detection of probe cantilever 46 displacement is typically implemented via the laser beam deflection technique. Although this is the most common approach other techniques may instead be used, such as piezoelectric detection, optical interferometric detection etc. FIGS. 3A and 3B illustrate an example of laser beam detection. A laser beam 40, emanates from the laser module 38, and is focused onto the reflective top surface of probe cantilever 46 on probe 30. The reflected laser beam 42 projects upon a position sensing photodiode 34. When probe cantilever 46 on probe 30 is displaced in the Z axis the reflected laser beam 42 translates across position sensing photodiode 34. In this manner, electrical signals from position sensing photodiode 34 provide an indication of Z-displacement of probe cantilever 46, and the surface contours of sample 24 may be mapped using knowledge of the X-Y position and Z height.

One design attends to the problem of eliminating net forces on the probe clamp during a probe exchange via a method of pneumatically or hydraulically grasping the probe such that manual handling is no longer required. The design is compact and lightweight, features often critical for scanning probe microscopes.

FIGS. 3A and 3B also show components used in the probe replacement process including a probe storage device 26 and Z axis translation stage 36. The XY translation stage 22 is utilized to position the probe storage device 26 beneath probe clamp module 28. Z axis translation stage 36 raises and lowers the high resolution positioning mechanism 32 and probe clamp module 28 with respect to the probe storage device 26.

In the configuration of FIGS. 3A and 3B, the probe clamp module 28 mechanically mounts directly to the tube-type high resolution positioning mechanism 32. Further, the probe clamp module 28 is connected to an actuator including a flexible hose 52a which supplies pneumatic or hydraulic pressure, such that the physical element which clamps and unclamps the probe 30 receive no net force from external sources (aside from possibly some static force associated with the weight or stiffness of the flexible hose 52a). That is, the pneumatic or hydraulic forces are generated internal to the probe clamp module 28, much like isometric resistance exercises. As a consequence, the probe replacement operations generate no external forces that might be transmitted to the delicate piezoelectric assembly 32. Moreover, the transducer that controls the pneumatic or hydraulic pressure in the flexible hose 52a is not mounted on the probe clamp module 28, but rather to an adjacent housing of the piezo-tube scanner SPM. This reduces the mass of the probe clamp module 28 thus enabling high speed Z-axis scanning.

As mentioned, the actuator imposes no net forces upon the piezoelectric assembly. With that said, there may be relatively minor or de minimus "external" forces associated with positioning the clamp over each probe. For instance, in the probe pickup process, contact with probe 30 is determined by electronically monitoring for a very slight vertical (Z) force acting on the high resolution positioning mechanism 28 as a result of contact between probe clamp module 28 and probe 30. This is the result of the slow downward movement of Z axis translation stage 36, intended to cause the clamp module 28 to contact probe 30 (prior to engaging probe clamp 56). To be clear, the distinction between "internal" vs. "external" forces acting upon on a probe clamping mechanism only applies to the process of actually clamping probe 30 in place, or releasing it. Initial detection of contact with the probe 30 does impart very slight forces to the high resolution positioning mechanism 28, but these forces are so slight they do not risk damage.

FIGS. 4A-4C provide perspective, cutaway and exploded views of probe clamp module 28 in its closed position. FIGS. 5A-5C provide similar views of probe clamp module 28 in its opened position. The probe clamp module 28 comprises an outer housing or base 50, an inflatable bladder 52 supplied by a flexible hose 52a and positioned above a pivoting lever 54, a probe clamp 56, a return spring clip 58 located under the lever 54, and a lower cover 60 which affixes to the base 50. The probe clamp 56 mounts for rotation in a vertical plane about a horizontal axis on a pin 62 fixed with respect to the lower cover 60 (and base 50). The probe clamp 56 features an angled cam slot 64 within which travels a cam member 66 affixed to the lever 54. The lever 54 pivots in a vertical plane about an axle 68 which is journaled for rotation between complementary cutouts 70 in both the base 50 and lower cover 60.

The probe clamp 56 opens and closes via the position of the pivoting lever 54, which is controlled via the relative forces acted upon it by the bladder 52 and the spring clip 58. In turn, the lever 54 acts on the probe clamp 56 via the cam 66 and cam slot 64.

Referring to FIGS. 4A-4C, when no pneumatic or hydraulic pressure is applied to bladder 52, little or no downward force is exerted by bladder 52 upon lever 54. The bladder in its non-pressurized state is relatively collapsed in vertical section as shown, such as in a wedge-shaped configuration. Conversely, a stronger upwards force is exerted upon lever 54 by V-shaped spring clip 58, which exerts opposing forces between the lever 54 and lower cover 60. As a result, the force exerted by spring clip 58 dominates, and the resulting net force displaces or biases lever 54 upward so as to cause probe clamp 56, via pin 66 and cam slot 64, to close upon, and thereby clamp in place, probe 30, as in FIG. 4B.

Conversely, referring to FIGS. 5A-5C, when pneumatic or hydraulic pressure is applied to bladder 52, causing it to assume an expanded pressurized state, significant downward force is exerted by bladder 52 upon lever 54, exceeding the opposing force exerted upon lever 54 by spring clip 58. As a result the force exerted by bladder 52 now dominates, and the resulting net force displaces or biases lever 54 downward in such a way as to cause probe clamp 56 to pivot open, thereby releasing probe 30.

In some cases the transducer is not mechanically mounted to the moving portion of the Z scanner. This helps keep the weight and volume of the moving portion of the Z scanner low, thereby allowing it to scan at high speeds. Variations of these embodiments are seen in FIGS. 6A-6C, as well as others.

Figure 6B:
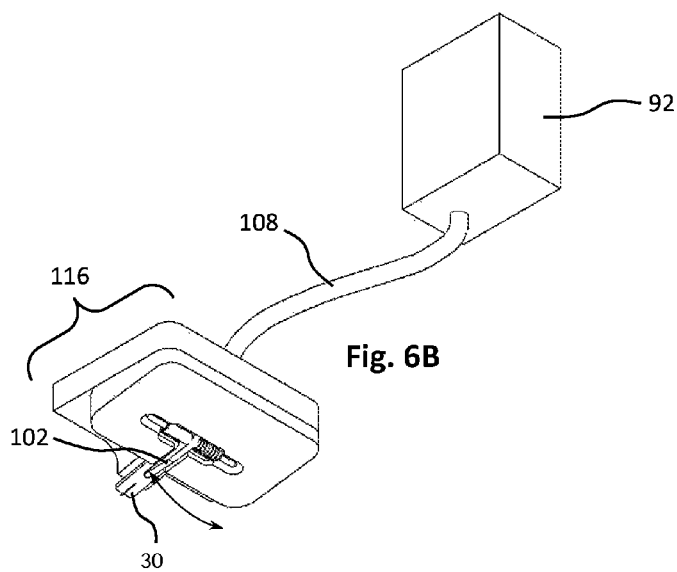
Figure 7:
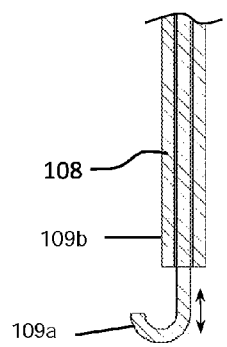
FIG. 7 is a cross-sectional view of one embodiment of a linearly actuated cable of the assembly shown in 6A-6C.
Figure 6C:
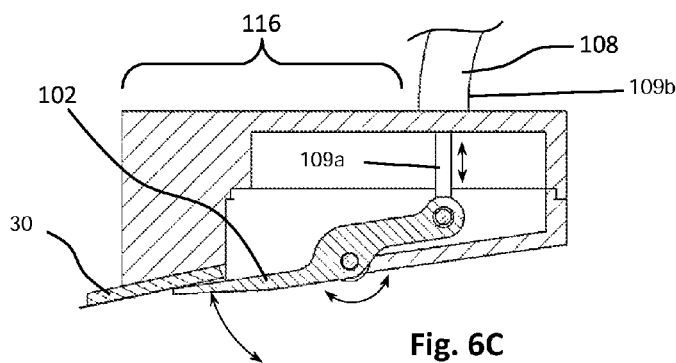
FIG. 6C is a cross-sectional close-up view of the probe holder of the assembly shown in FIGS. 6A and 6B.

FIGS. 6A and 6B provide perspective views of one embodiment of a linear-actuating assembly including a transducer that applies no net forces to the probe clamp module 116, and FIG. 6C provides a cross-sectional close-up view to more clearly illustrate the mechanics. In this embodiment the linear transducer 92 utilizes a flexible link consisting of linear cable 108 to convey linear motion to the linear probe clamp module 116. Linear cable 108 is shown in a cutaway view in FIG. 7, and is comparable to a small, ultra-flexible and lightweight version of a mechanical brake cable used on a bicycle. Linear transducer 92 retracts the center portion 109a of linear cable 108 relative to an outer sheath 109b in order to open linear actuated clamp 102, either in preparation to clamp onto probe 30, or to release a probe 30 which is already in place. Linear transducer 92 advances the center portion 109a relative to the outer sheath 109b in order to grasp a probe 30. In this case the flexibility of linear cable 108 allows unobstructed scanning of probe 30 during normal operation of the SPM. This assembly could also be configured to open linear actuated clamp 102 upon extension, as opposed to retraction, of the center portion of linear cable 108.

The configuration of FIGS. 6A and 6B again features an actuator for the probe clamp module 116 that transmits no external forces to the piezoelectric scanner assembly. This may be considered a so-called "internal" force transducer. As seen in FIG. 6C, the outer sheath 109b of the linear cable 108 is preferably fixed with respect to the housing of the probe clamp module 116 such that forces generated by displacement of the center portion 109a are isolated to the reaction forces between the locations where the ends of the sheath and center portion contact elements of the clamp module 116. Again, this works similar to a bicycle brake cable, and results in no net force to the clamp module 116.

The actuators and probe clamps described above in FIGS. 4-9 are lightweight so that they can be mounted to the Z-axis scanners and not degrade the high speed Z-axis displacements of the piezoelectric mechanisms. Each actuator/probe clamp arrangement picks up only one probe at a time, and thus there are no moving carousels or such bulky mechanisms.

FIGS. 8A and 8B provide perspective views of one embodiment of a rotationally-actuating assembly, and FIG. 8C provides a cross-sectional close-up view to more clearly illustrate the mechanics. In this embodiment a rotary transducer 90 utilizes a flexible link consisting of rotary cable 110 to convey rotary motion to the rotary probe clamp module 114. Rotary cable 110 is shown in a cutaway view in FIG. 9, and is comparable to a small, ultra-flexible and lightweight version of a mechanical automobile speedometer cable. Rotary transducer 90 rotates a center portion 111a of rotary cable 110 relative to an outer sheath 111b in order to open rotation actuated clamp 104, either in preparation to clamp onto probe 30, or to release a probe 30 which is already in place. The reverse process is implemented in order to grasp a probe 30. In this case the flexibility of rotary cable 110 allows unobstructed scanning of probe 30 during normal operation of the SPM. In a similar way as the linear cable described above, the configuration of FIGS. 8A and 8B features an "internal" force transducer for the probe clamp module 114 that transmits no external forces to the scanner.

Figure 10A:
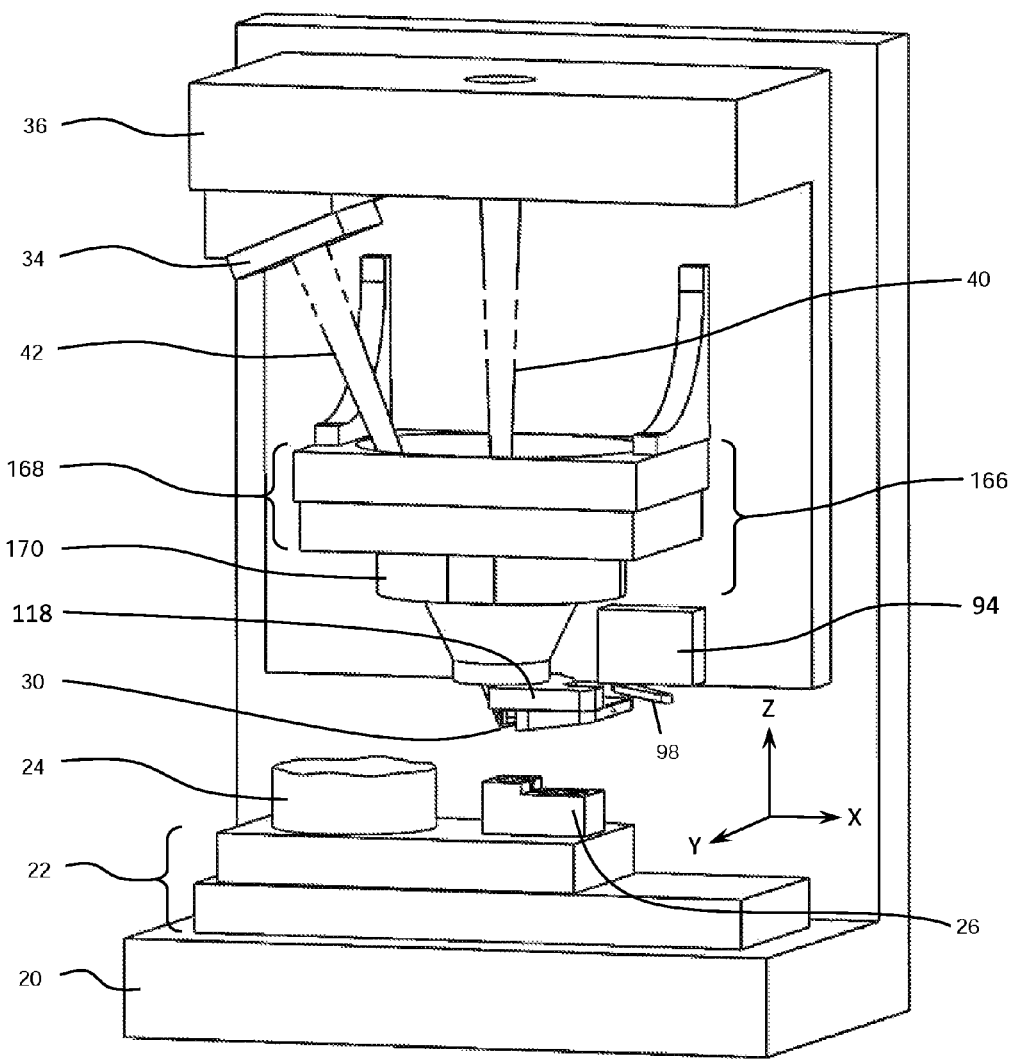
FIG. 10A is a simplified perspective view of a typical flexure-based optical-deflection scanning probe microscope. The view includes a lever-actuating transducer mounted to the Z-axis stage, as well as an associated probe holder.
Figure 10B:
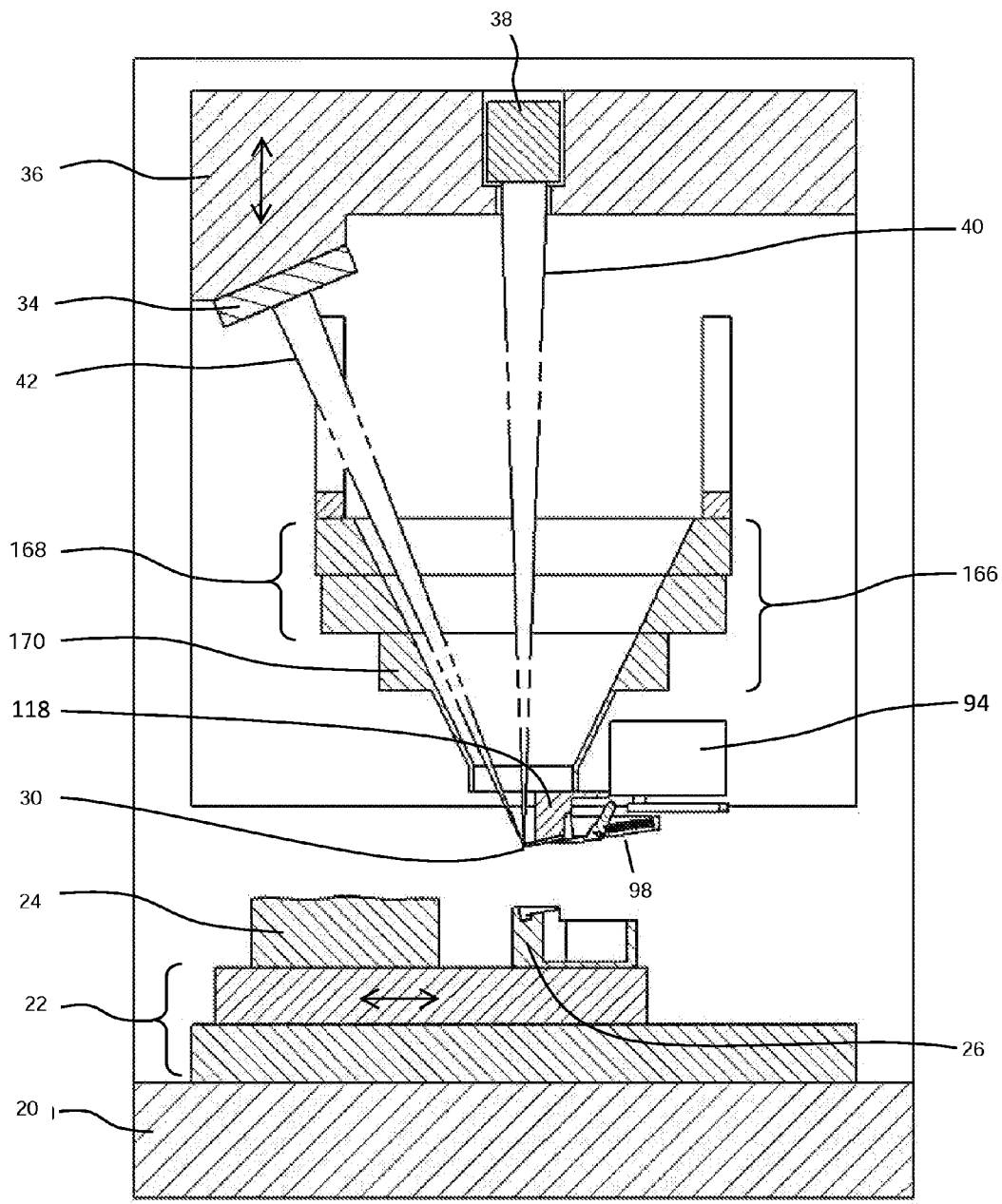
FIG. 10B is a cutaway view of the image shown in FIG. 10A, a typical flexure-based optical-deflection scanning probe microscope. The view includes a lever-actuating transducer mounted to the Z-axis translation stage, as well as an associated probe holder.

FIGS. 10A and 10B provide perspective and cutaway views of one embodiment of a piezo flexure-based scanned probe SPM integrating a lever-actuating assembly including a transducer for automated probe exchange. Levered transducer 94 is mounted to a Z-axis translation stage 36 wherein a lever 98 rotates underneath the transducer 94 to contact and actuate a levered probe clamp module 118. Not only do FIGS. 10A and 10B illustrate the flexure-based scanned probe SPM, but they also show an "external" type of force transducer where the transducer 94 is not mounted to the probe clamp module 118 and so the lever does apply a net force thereto.

Other components used in the probe replacement process within a flexure-based scanned probe SPM are also shown in FIGS. 10A and 10B. These include a base 20, an XY translation stage 22, a Z axis translation stage 36, a sample 24, a probe storage device 26, and the levered probe clamp module 118. XY translation stage 22 is utilized to position either probe storage device 26 or sample 24 beneath levered probe clamp module 118, which is mounted to flexure scanner 166. Z axis translation stage 36 is utilized to raise and lower flexure scanner 166 and levered probe clamp module 118 with respect to probe storage device 26 or sample 24.

FIGS. 10A and 10B include several components typical of scanning probe microscopes, for which additional description is in order.

SPMs typically scan probe tip 44 of probe 30 (see FIG. 1) along the surface of sample 24 in a raster pattern within the plane of the sample, generally referred to as the XY plane. The raster movement is achieved via a flexure scanner 166 or tube scanner 32 (e.g., FIG. 13), as mentioned, or a combination of elements thereof. During this process probe cantilever 46 is typically displaced in the Z axis (which is typically vertical) as a function of sample height, or another characteristic such as magnetic field, electric field, etc.

Detection of displacement of probe cantilever 46 is typically implemented via the laser beam deflection technique. (Although this is the most common approach other techniques may instead be used, such as piezoelectric detection, optical interferometric detection etc.) With this technique a laser beam 40, emanates from the laser module 38, and is focused onto the reflective top surface of probe cantilever 46 on probe 30. The reflected laser beam 42 projects upon position sensing photodiode 34. When probe cantilever 46 on probe 30 is displaced in the Z axis the reflected laser beam 42 translates across position sensing photodiode 34. In this manner, electrical signals from position sensing photodiode 34 provide an indication of Z displacement of probe cantilever 46.

Figure 11:
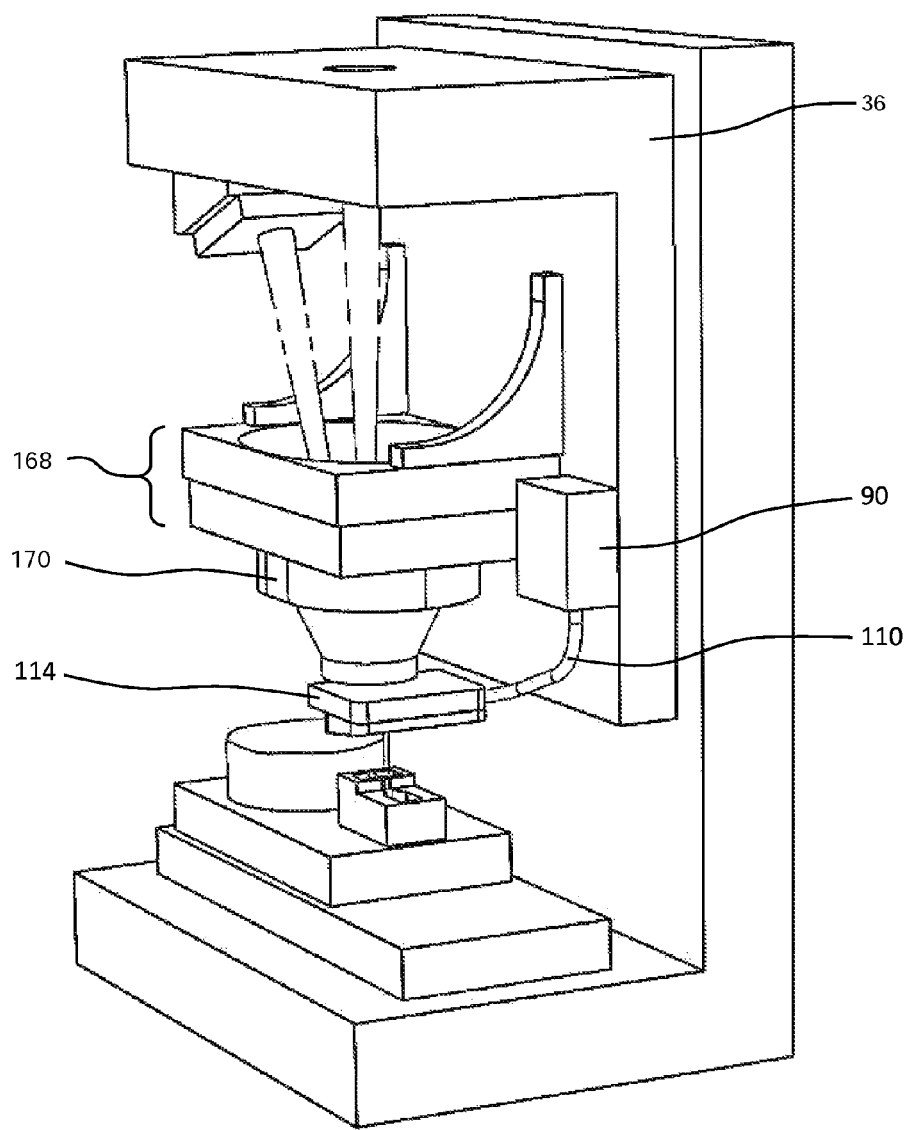
FIG. 11 is a simplified perspective view of a typical flexure-based optical-deflection scanning probe microscope. The view includes a rotationally-actuating transducer mounted to the Z-axis stage, as well as an associated probe holder.

FIG. 11 provides a perspective view of one embodiment of a piezo flexure-based scanned probe SPM integrating a rotationally-actuating transducer for automated probe exchange. In this case a rotary transducer 90 is mounted to Z axis translation stage 36, and a detailed explanation of the rotationally-actuating transducer assembly will be found in the above descriptions for FIGS. 8A-8C. In short, rotary transducer 90 connects with the probe clamp module 114 via a flexible link consisting of rotary cable 110. This is an example of an "internal" actuator for a flexure-based scanned probe SPM. Although the transducer 90 is not mounted to the probe clamp module 114, it does not apply a net force thereto due to the rotary cable 110 drive system as was explained in conjunction with FIGS. 8-9.

Figure 12:
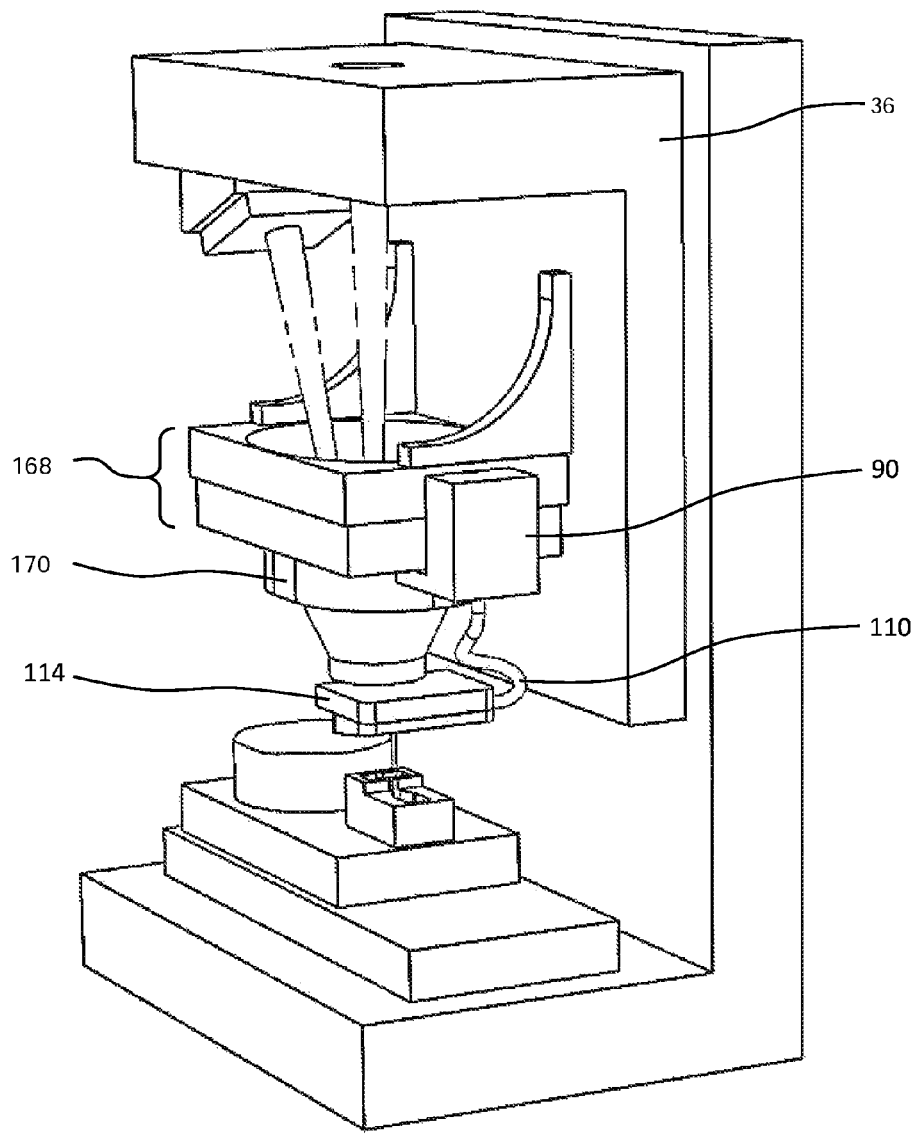
FIG. 12 is a simplified perspective view of a typical flexure-based optical-deflection scanning probe microscope. The view includes a rotationally-actuating transducer mounted to the moving portion of the XY flexure scanner, as well as an associated probe holder.

FIG. 12 provides a perspective view of another embodiment of a piezo flexure-based scanned probe SPM integrating a rotationally-actuating transducer for automated probe exchange, much like described above for FIGS. 8A-8C. In this case rotary transducer 90 is mounted to the moving portion of XY flexure scanner 168 and connects with the probe clamp module 114 via rotary cable 110. Again, this is an "internal" actuator for a flexure-based scanned probe SPM, and though the transducer 90 is mounted off the probe clamp module 114, it does not apply a net force thereto due to the rotary cable 110 drive system.

Figure 13:
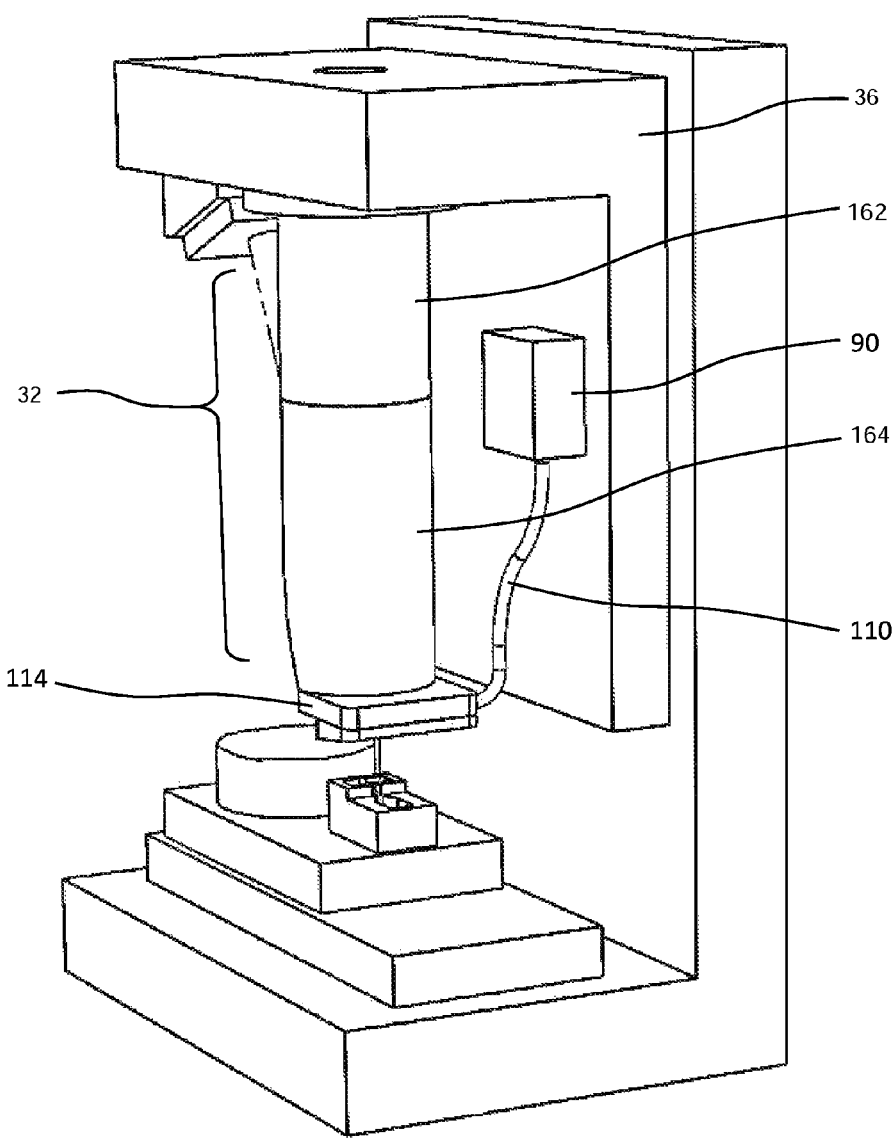
FIG. 13 is a simplified perspective view of a typical piezo tube-based optical-deflection scanning probe microscope. The view includes a rotationally-actuating transducer mounted to the Z-axis stage, as well as an associated probe holder.

FIG. 13 provides a perspective view of one embodiment of a piezo tube-based scanned probe SPM integrating another "internal" rotationally-actuating transducer for automated probe exchange. In this case rotary transducer 90 as in FIGS. 8A-8C is mounted to Z axis translation stage 36 and again connects with the probe clamp module 114 via rotary cable 110. The internal forces generated by the system help protect the delicate piezo tube-based scanner.

Figure 14:
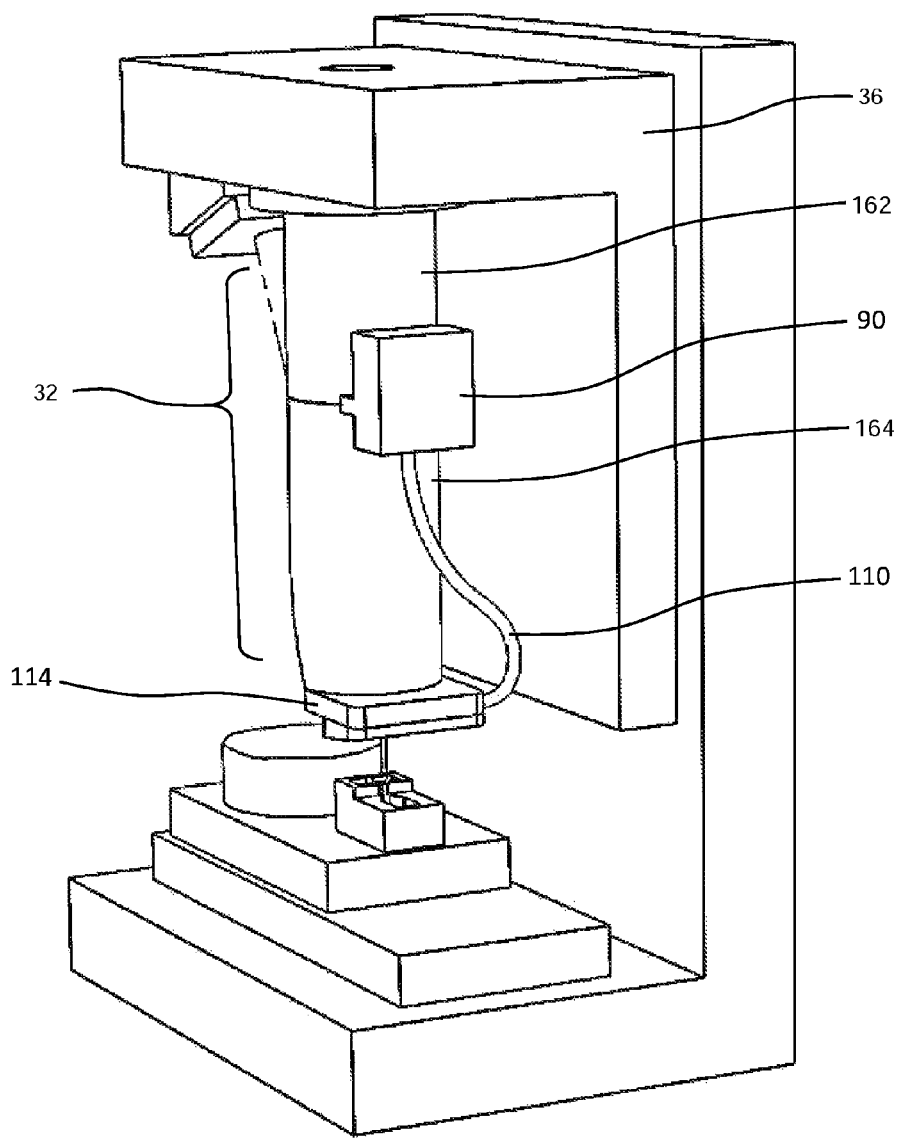
FIG. 14 is a simplified perspective view of a typical piezo tube-based optical-deflection scanning probe microscope. The view includes a rotationally-actuating transducer mounted to the moving portion of the XY piezo-tube scanner, as well as an associated probe holder.

FIG. 14 provides a perspective view of another embodiment of a piezo tube-based scanned probe SPM integrating another "internal" rotationally-actuated transducer for automated probe exchange. In this case rotary transducer 90 is mounted to the moving end of XY tube scanner 162 and connects with the probe clamp module 114 via rotary cable 110.

Figure 15:
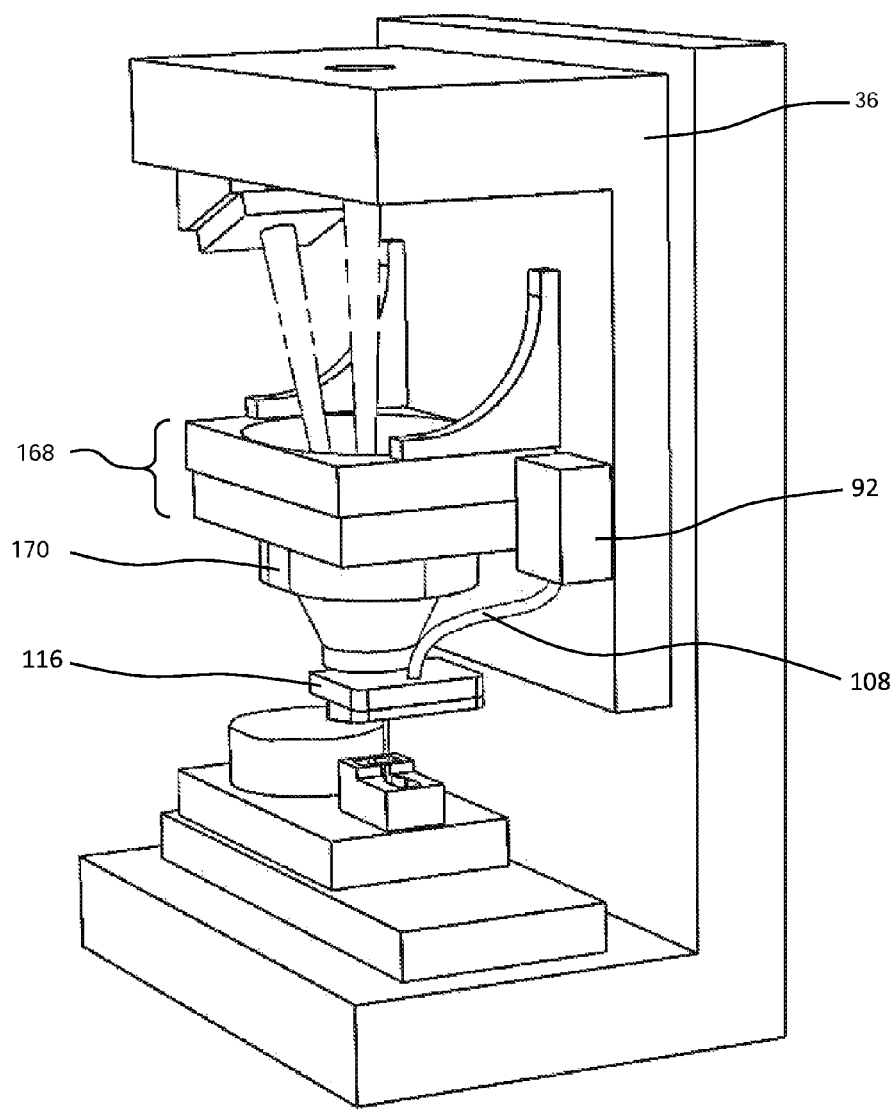
FIG. 15 is a simplified perspective view of a typical flexure-based optical-deflection scanning probe microscope. The view includes a linear-actuating transducer mounted to the Z-axis stage, as well as an associated probe holder.

FIG. 15 provides a perspective view of one embodiment of a piezo flexure-based scanned probe SPM integrating a linearly-actuating transducer for automated probe exchange. In this case linear transducer 92 is mounted to Z axis translation stage 36 and connects with the probe clamp module 116 via flexible linear cable 108. A detailed explanation of the linearly-actuating transducer assembly will be found in the above descriptions for FIGS. 6A-6C.

Figure 16:
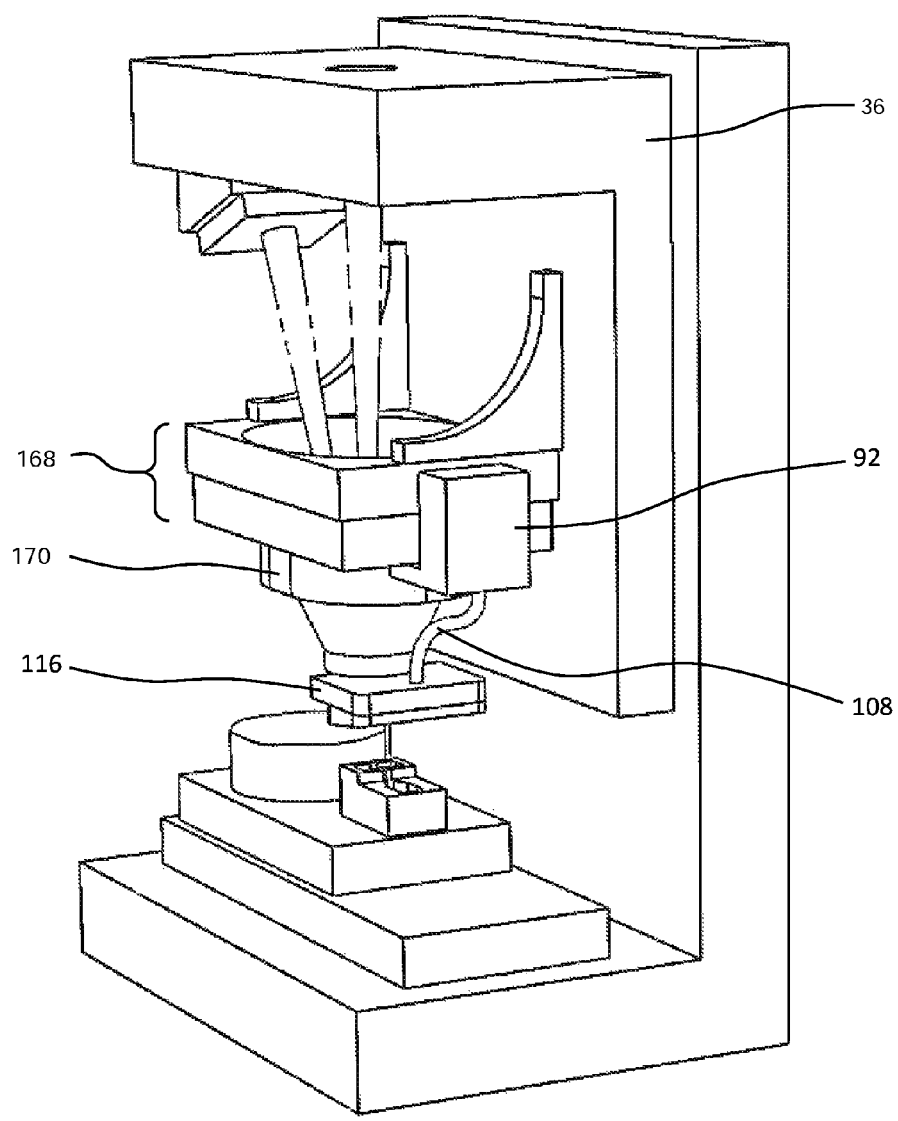
FIG. 16 is a simplified perspective view of a typical flexure-based optical-deflection scanning probe microscope. The view includes a linear-actuating transducer mounted to the moving portion of the XY flexure scanner, as well as an associated probe holder.

FIG. 16 provides a perspective view of another embodiment of a piezo flexure-based scanned probe SPM integrating a linearly-actuating transducer for automated probe exchange. In this case linear transducer 92 is mounted to the moving portion of XY flexure scanner 168 and connects with the probe clamp module 116 via flexible linear cable 108.

Figure 17:
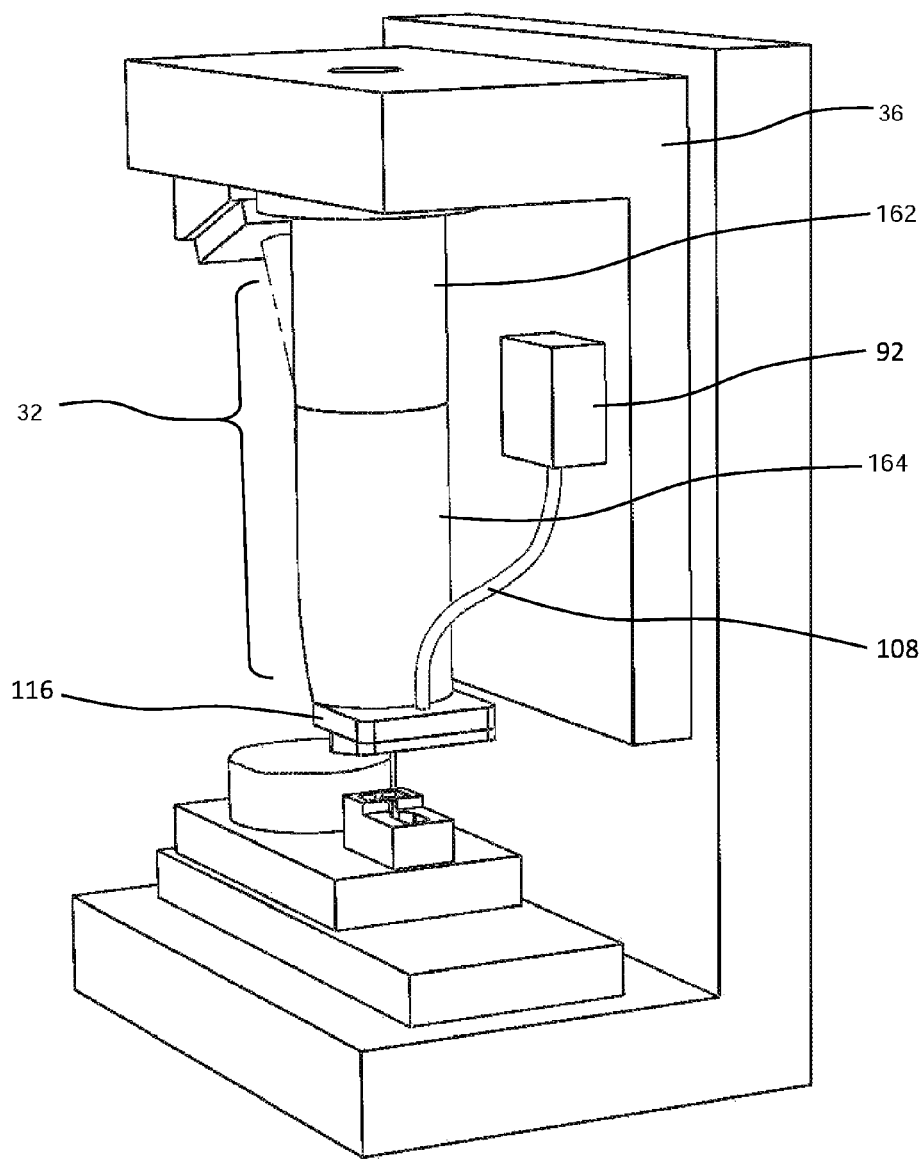
FIG. 17 is a simplified perspective view of a typical piezo tube-based optical-deflection scanning probe microscope. The view includes a linear-actuating transducer mounted to the Z-axis translation stage, as well as an associated probe holder.

FIG. 17 provides a perspective view of one embodiment of a piezo tube-based scanned probe SPM integrating a linearly-actuating transducer for automated probe exchange. In this case linear transducer 92 is mounted to Z axis translation stage 36 and again connects with the probe clamp module 116 via flexible linear cable 108, which isolates the forces to be "internal" to the clamp module.

Figure 18:
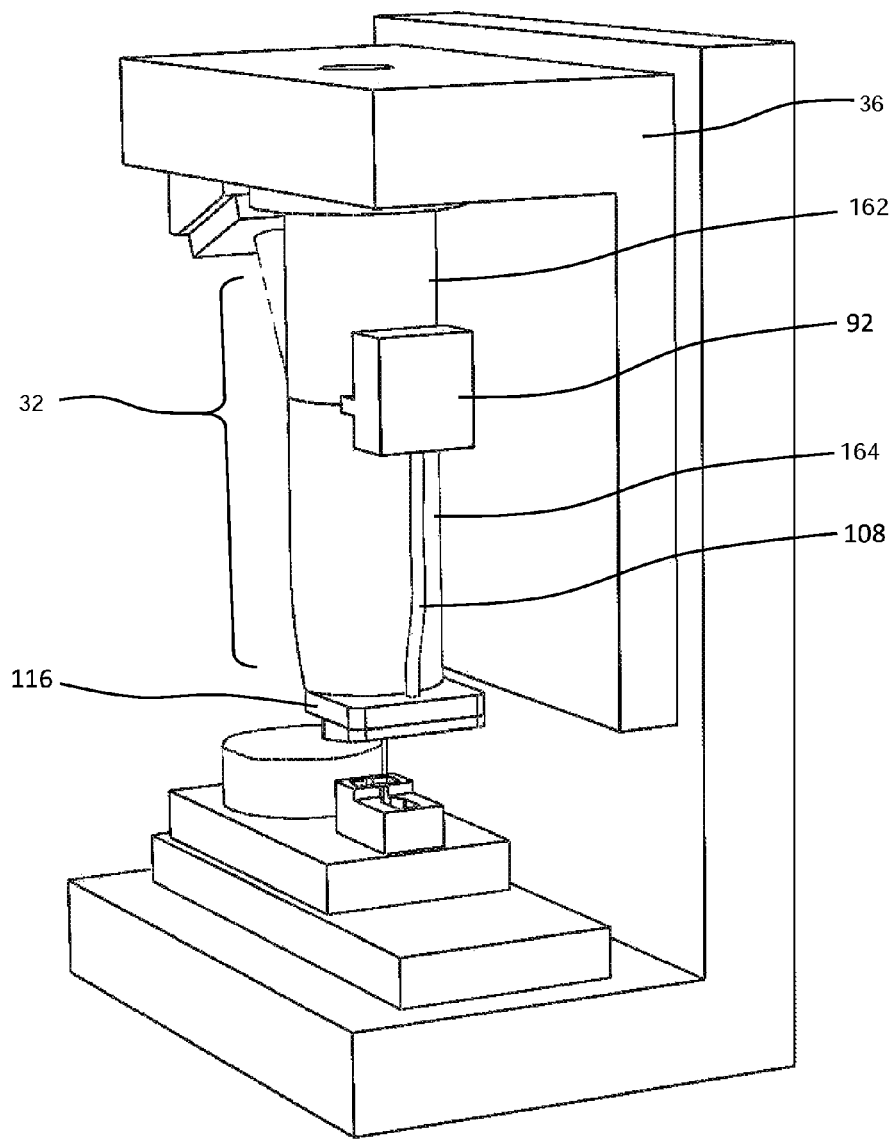
FIG. 18 is a simplified perspective view of a typical piezo tube-based optical-deflection scanning probe microscope. The view includes a linear-actuating transducer mounted to the moving portion of the XY piezo-tube scanner, as well as an associated probe holder.

FIG. 18 provides a perspective view of another embodiment of a piezo tube-based scanned probe SPM integrating a linearly-actuated transducer for automated probe exchange. In this case linear transducer 92 is mounted to the moving end of XY tube scanner 162 and connects with the probe clamp module 116 via flexible linear cable 108.

Operation

For clarity, the following descriptions for probe pickup and release will center upon only one of the SPM configurations described above. This is the piezoelectric tube-based high resolution positioning mechanism SPM with pneumatic or hydraulic probe clamp module 28, mounted to high resolution positioning mechanism 32, as shown in FIGS. 3A and 3B. Details of probe clamp module 28 are shown in FIGS. 4A-5C. Nonetheless the following processes can be seen to apply to all configurations.

Probe Pickup

Probe 30 is assumed resting in probe storage device 26, ready to be picked up.

Z axis translation stage 36 moves high resolution positioning mechanism 32 and probe clamp module 28 upward.

XY translation stage 22 positions probe storage device 26 below probe clamp module 28.

Pneumatic or hydraulic pressure is applied to bladder 52 within probe clamp module 28 causing probe clamp 56 to open.

Z axis translation stage 36 moves high resolution positioning mechanism 32 and probe clamp module 28 downward until contact is detected between probe clamp module 28 and probe 30. Contact can be determined by monitoring electrical changes within high resolution positioning mechanism 32, or from position sensors attached to high resolution positioning mechanism 32.

Pneumatic or hydraulic pressure is then terminated to bladder 52 in probe clamp module 28 causing probe clamp 56 to close, thereby clamping in place probe 30.

Z axis translation stage 36 again moves high resolution positioning mechanism 32 and probe clamp module 28 upward, carrying probe 30 with it.

XY translation stage 22 positions sample 24 below probe 30 on probe clamp module 28.

Alignment of incident laser beam 40 onto probe cantilever 46 is then implemented by manual or motorized positioning of incident laser beam 40.

Alignment of reflected laser beam 42 relative to positioning sensing photodiode 34 is then implemented by manual or motorized positioning (via mirrors for example).

Z axis translation stage 36 moves high resolution positioning mechanism 32 and probe clamp module 28 downward until contact is detected between probe 30 and sample 24. Contact is determined by monitoring the electrical signals from position sensing photodiode 34 in the usual fashion.

The SPM system is now ready to be operated in the usual fashion.

Probe Release

Z axis translation stage 36 moves high resolution positioning mechanism 32 and probe clamp module 28 with attached probe 30 upward.

XY translation stage 22 positions probe storage device 26 below probe clamp module 28 and probe 30.

Z axis translation stage 36 moves high resolution positioning mechanism 32, probe clamp module 28 and probe 30 downward until contact is detected between probe 30 and probe storage device 26. As before, contact can be determined by monitoring electrical changes within the high resolution positioning mechanism 32, or from position sensors attached to high resolution positioning mechanism 32.

Pneumatic or hydraulic pressure is applied to bladder 52 within probe clamp module 28 causing probe clamp 56 to open, thereby releasing probe 30.

Z axis translation stage 36 again moves high resolution positioning mechanism 32 and probe clamp module 28 upward leaving probe 30 in the probe storage device 26.

Alternative Embodiments

While several styles of SPMs are presented in this document, they are representative only, and included to illustrate a subset of possible SPM configurations.

Probe clamp module 28 incorporates bladder 52, and spring clip 58—which imparts an oppositional force to bladder 52. Several alternate embodiments are possible:

The positions of bladder 52 and spring clip 58 can be interchanged.

In the current embodiment spring clip 58 provides an outwardly-directed force. Alternately this could be reconfigured to provide an inward-pulling force The above embodiments enable the following:

Probe clamp module 28 can be configured to close upon pressurization of bladder 52 and open upon release of said pressure.

Probe clamp module 28 can be configured to close upon the application of a vacuum to bladder 52 and open upon release of said vacuum.

Probe clamp module 28 can be configured to open upon the application of a vacuum to bladder 52 and close upon release of said vacuum.

Probe clamp module 28 incorporates lever 54 and probe clamp 56. Alternatively, these two components can be combined into one component.

Probe storage device 26 can be configured to hold multiple probes 30.

Probe storage device 26 may be treated with a mild adhesive to gently hold in place probe(s) 30 during storage. The clamping force of probe clamp module 28 would be greater than the holding force of the adhesive.

In the current embodiment probe 30 is clamped directly by clamp 56 within the probe clamp assembly 28. Alternatively, probe 30 could be pre-fastened to an intermediate component or assembly which, in turn, could be clamped by clamp 56 in probe clamp assembly 28.

In the current embodiment the XY translation stage 22 moves sample 24 and probe storage device 26. Alternately XY translation stage 22 could be configured to move high resolution positioning mechanism 32 and probe clamp module 28.

In the current embodiment the Z axis translation stage 36 moves the high resolution positioning mechanism 32 and probe clamp module 28. Alternately Z axis translation stage 36 could be configured to move sample 24 and/or probe storage device 26.

In the current embodiment the probe storage device 26 is mounted to XY translation stage 22. Alternately probe storage device 26 could be mounted to an independent XY and/or Z axis translation stage.

In the current embodiment the high resolution positioning mechanism 32 moves probe clamp module 28. Alternately high resolution positioning mechanism 32 could be configured to move sample 24 and/or probe storage device 26.

It is also worth noting that the present systems and methods for probe exchange are adapted to operate in ambient non-clean-room conditions without causing turbulence and imparting vibration to the probe. As mentioned above, certain existing systems for probe exchange utilize a vacuum to directly attach the probe to a mounting interface. This is only effective in cleanroom environments free from dust and airborne particulates, it is not effective in ambient conditions typical of laboratory environments. Namely, in ambient conditions airborne particulates become lodged in the interface between the probe and its mating surface, causing turbulence and imparting vibration to the probe, and resulting in unacceptable system noise.

Within rotary probe clamp module 114 and linear probe clamp module 116 there may be more or less components involved in conveying the given mechanical movement to the respective probe clamps.

In the current embodiment XY translation stage 22 moves sample 24 and probe storage device 26. Alternately XY translation stage 22 could be configured to move flexure scanner 166 (or tube scanner 32) along with the given probe clamp module.

In the current embodiment Z axis translation stage 36 moves flexure scanner 166 (or tube scanner 32) and the given probe clamp module. Alternately Z axis translation stage 36 could be configured to move sample 24 and/or probe storage device 26.

In the current embodiment probe storage device 26 is mounted to XY translation stage 22. Alternately probe storage device 26 could be mounted to an independent XY and/or Z axis translation stage.

In the current embodiment flexure scanner 166 (or tube scanner 32) moves the given probe clamp module. Alternately flexure scanner 166 (or tube scanner 32) could be configured to move sample 24 and/or probe storage device 56.

Piezo tube scanners and piezo flexures may be interchanged within the designs in any combination.

Closing Comments

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A probe exchange assembly for scanning probe microscopes, the scanning probe microscope including a piezoelectric scanner capable of vertical, Z-axis displacement over a sample to be scanned which may be displaced in the horizontal, X-Y plane, the assembly comprising:
   a) a probe clamp module mounted to the scanner such that forces applied thereto will be transmitted to the scanner, the scanner adapted to impart vertical movement to the clamp module, the clamp module having a movable probe clamp configured to open and close and respectively mechanically release and hold probes; and
   b) an actuator physically connected to and adapted to open and close the movable probe clamp that imposes no net external forces to the clamp module, and thus no net external forces to the scanner, as a consequence thereof, wherein
   the probe exchange assembly is adapted to operate in ambient non-clean-room conditions without causing turbulence and imparting vibration to the probe.

2. The probe exchange assembly of claim 1, wherein the probe clamp module comprises an outer housing to which the probe clamp is mounted for movement, and wherein the actuator comprises an inflatable bladder disposed within the housing and configured to move the probe clamp.

3. The probe exchange assembly of claim 2, wherein the actuator further comprises a flexible hose connected to supply pneumatic or hydraulic pressure or vacuum to the bladder.

4. The probe exchange assembly of claim 3, wherein the actuator further comprises a transducer that controls the pneumatic or hydraulic pressure or vacuum in the flexible hose and which is not mounted on the probe clamp module.

5. The probe exchange assembly of claim 2, wherein the inflatable bladder is positioned adjacent to and acts on a pivoting lever such that inflation and deflation of the bladder causes movement of the pivoting lever which in turn causes movement of the probe clamp.

6. The probe exchange assembly of claim 5, wherein the probe clamp includes an angled cam slot within which travels a cam member affixed to the pivoting lever, and wherein clamping movement of the pivoting lever causes the probe clamp to open via the cam member acting on the cam slot.

7. The probe exchange assembly of claim 5, further including a return spring clip that also acts on the pivoting lever in opposition to the force associated with the bladder.

8. The probe exchange assembly of claim 7, wherein the spring clip is V-shaped.

9. The probe exchange assembly of claim 1, wherein the probe clamp module comprises an outer housing to which the probe clamp is mounted for rotation, and wherein the actuator comprises a flexible cable including an outer sheath secured to the clamp module and a movable center portion that acts on the movable probe clamp to open and close the clamp.

10. The probe exchange assembly of claim 9, further including a transducer that linearly actuates the movable center portion within the outer sheath.

11. The probe exchange assembly of claim 9, further including a transducer that rotationally actuates the movable center portion within the outer sheath.

12. A probe exchange assembly for scanning probe microscopes, the scanning probe microscope including a piezoelectric scanner capable of vertical, Z-axis displacement over a sample to be scanned which may be displaced in the horizontal, X-Y plane, the assembly comprising:
   a) a probe clamp module comprising an outer housing mounted to the scanner, the scanner adapted to impart vertical movement to the clamp module, the clamp module having a movable probe clamp configured to open and close and respectively mechanically release and hold probes; and
   b) an actuator connected to open and close the movable probe clamp that imposes no net external forces to the clamp module as a consequence thereof, the actuator comprising an inflatable bladder disposed within the housing and configured to move the probe clamp, wherein
   the probe exchange assembly is adapted to operate in ambient non-clean-room conditions without causing turbulence and imparting vibration to the probe.

13. The probe exchange assembly of claim 12, wherein the probe clamp is mounted for rotation, and the inflatable bladder is configured to rotate the probe clamp.

14. The probe exchange assembly of claim 12, wherein the actuator further comprises a flexible hose connected to supply pneumatic or hydraulic pressure or vacuum to the bladder.

15. The probe exchange assembly of claim 14, wherein the actuator further comprises a transducer that controls the pneumatic or hydraulic pressure in the flexible hose and which is not mounted on the probe clamp module.

16. The probe exchange assembly of claim 12, wherein the inflatable bladder is positioned adjacent to and acts on a pivoting lever such that inflation and deflation of the bladder causes movement of the pivoting lever which in turn causes movement of the probe clamp.

17. The probe exchange assembly of claim 16, wherein the probe clamp includes an angled cam slot within which travels a cam member affixed to the pivoting lever, and wherein clamping movement of the pivoting lever causes the probe clamp to open via the cam member acting on the cam slot.

18. The probe exchange assembly of claim 16, further including a return spring clip that also acts on the pivoting lever in opposition to the force associated with the bladder.

19. The probe exchange assembly of claim 18, wherein the spring clip is V-shaped.

* * * * *